United States Patent
Bensmann

(10) Patent No.: US 12,168,511 B2
(45) Date of Patent: Dec. 17, 2024

(54) FLOW BODY WITH TWO HEATING DEVICES DISTANCED IN CHORDWISE DIRECTION

(71) Applicant: Airbus Operations GmbH, Hamburg (DE)

(72) Inventor: Stefan Bensmann, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 198 days.

(21) Appl. No.: 17/940,101

(22) Filed: Sep. 8, 2022

(65) Prior Publication Data
US 2023/0069974 A1   Mar. 9, 2023

(30) Foreign Application Priority Data
Sep. 8, 2021   (EP) .................................... 21195592

(51) Int. Cl.
*B64C 9/24*   (2006.01)
*B64D 15/14*   (2006.01)

(52) U.S. Cl.
CPC ................ *B64C 9/24* (2013.01); *B64D 15/14* (2013.01)

(58) Field of Classification Search
CPC .... B64C 9/24; B64C 9/22; B64C 9/16; B64C 9/18; B64D 15/14; B64D 15/12
See application file for complete search history.

(56) References Cited

U.S. PATENT DOCUMENTS

| | | | |
|---|---|---|---|
| 10,569,859 B2 | 2/2020 | Everaert et al. | |
| 2010/0102172 A1* | 4/2010 | Bardwell | B64D 15/12  29/402.03 |
| 2010/0308169 A1* | 12/2010 | Blanchard | B29C 70/86  244/130 |
| 2011/0024566 A1* | 2/2011 | Soenarjo | H02G 11/02  244/131 |

(Continued)

FOREIGN PATENT DOCUMENTS

| | | |
|---|---|---|
| CN | 105 416 593 | 3/2016 |
| CN | 112 124 556 | 12/2020 |

(Continued)

OTHER PUBLICATIONS

Extended European Search Report for EP21195592.7, dated Feb. 7, 2022, 12 pages.

(Continued)

*Primary Examiner* — Richard Green
*Assistant Examiner* — Nevena Aleksic
(74) *Attorney, Agent, or Firm* — Nixon & Vanderhye P.C.

(57) ABSTRACT

A flow body for an aircraft is disclosed having a stiffening structure and a flow surface at least partially enclosing the stiffening structure, the flow surface having a leading edge and a trailing edge at a distance to each other in a chordwise direction, the flow body including a first heating device attached to or integrated into the flow surface in a first chordwise section, a second heating device attached to or integrated into the surface body in a second chordwise section. The first chordwise section and the second chordwise section are distanced from each other, the first chordwise section is closer to the leading edge than the second chordwise section, and at least the second heating device comprises an electric heater.

14 Claims, 3 Drawing Sheets

(56) References Cited

U.S. PATENT DOCUMENTS

| | | | |
|---|---|---|---|
| 2015/0053663 A1 | 2/2015 | Sakota et al. | |
| 2015/0174843 A1* | 6/2015 | Crepin | B29C 70/021 |
| | | | 264/258 |
| 2019/0084682 A1* | 3/2019 | Aubert | B64D 15/22 |

FOREIGN PATENT DOCUMENTS

| | | |
|---|---|---|
| ES | 2 308 518 | 12/2008 |
| WO | 2006/010699 | 2/2006 |

OTHER PUBLICATIONS

EPO Communication for Application No. EP 21195592.7, six pages, dated Jul. 9, 2024.

\* cited by examiner

FLOW BODY WITH TWO HEATING DEVICES DISTANCED IN CHORDWISE DIRECTION

CROSS RELATED APPLICATION

This application claims priority to European Patent Application EP 21195592.7 filed Sep. 8, 2021, the entire contents of which is hereby incorporated by reference.

TECHNICAL FIELD

The invention relates to a flow body for an aircraft, a wing of an aircraft, an aircraft as well as a method of heating a flow surface of a flow body.

BACKGROUND

In commercial aircraft, the icing of wing components, control surfaces and other flow bodies is often prevented by using de-icing or anti-icing devices. A common approach to achieve this is to heat up respective parts with bleed air from turbofan engines. Also, mechanical de-icing devices are known, which burst ice accretions off. This can be done with pneumatically fillable bags or with actuators that locally deform a skin of the respective component. Furthermore, electric heating devices are known, which use electric power to produce heat for melting ice or for preventing icing of water. For example, electrically heated slats are known, which use heater mats attached to a top skin of the slat. Here, usually a front section including the leading edge is heated. Driven by air flow, water from melted ice may run back onto a rear section of the top skin, where it may locally ice.

SUMMARY

The invention contemplates an alternative slat that avoids ice accumulation in a rear section.

A flow body for an aircraft is proposed, comprising a stiffening structure and a flow surface at least partially enclosing the stiffening structure, the flow surface having a leading edge and a trailing edge at a distance to each other in a chordwise direction, the flow body further comprising a first heating device attached to or integrated into the flow surface in a first chordwise section, a second heating device attached to or integrated into the surface body in a second chordwise section, wherein the first chordwise section and the second chordwise section are distanced from each other, wherein the first chordwise section is closer to the leading edge than the second chordwise section, and wherein at least the second heating device comprises an electric heater.

The flow body may be a movable control surface, in particular a secondary control surface that belongs to a high lift system of a wing of an aircraft. For selectively influencing the aerodynamic characteristics of the wing, the flow body is couplable with the wing, in particular to a leading edge region. The flow body may be coupled with an actuating mechanism to be movable in a desired manner. In a neutral, i.e. a retracted position, the respective portion of the wing is clean and the flow body does not change the aerodynamic characteristics. In at least one extended position, the flow body is moved relative to the wing and exemplarily protrudes into the air flow upstream of the wing. For example, the flow body may be realized in the form of a leading edge slat, which is extendable in a forward and downward direction relative to the wing.

The flow body may extend along the spanwise direction at least in the retracted state. Accordingly, the flow body may comprise an elongate shape that extends along the spanwise direction and comprises a certain curved profile contour. The profile contour is mainly determined by the desired aerodynamic characteristics. It is preferred that the flow body is sufficiently stiff to maintain the profile contour in order to serve for the intended purpose, since it is directly exposed to a strong air flow during flight conditions.

The flow body comprises at least one skin, which spans over the stiffening structure and creates the flow surface. It is clear that the flow body may be designed according to a variety of different concepts. As stated above, the flow body may be a leading-edge slat, which comprises a substantially fixed shape. The slat may be coupled with a drive arrangement comprising a slat track, such that the slat is substantially moved in a forward direction between a retracted state, in which the slat is directly forward a fixed leading edge, and several extended positions. The motion path of the slat may also comprise a slight downward component. Still further, the flow body may constitute a droop or drooping nose, which comprises a substantially fixed position on the fixed leading edge of the wing but rotates around a substantially spanwise axis.

The flow body may comprise a trailing edge assembly, which has a honeycomb core or an at least partially solid metal component. Such a trailing edge assembly may be used for reducing the weight. It may be connected to a spar inside a forward assembly, forward part, or forward section of the flow body. Both the forward assembly and the trailing edge assembly may be covered by at least one skin to form a continuous flow body having the flow surface.

The first chordwise section may refer to the forward assembly, which may comprise the stiffening structure. The first heating device is attached to or integrated into the flow surface, i.e. the at least one skin, in the first chordwise section. The first heating device may be bonded to an inner surface of the at least one skin, it may be integrated into the at least one skin or it may be attached on top of the at least one skin, e.g. under a protective layer. The first heating device may also be merely integrated into the forward part of the flow body, depending on its operation technique. For example, the first heating device may comprise an electric heater that is directly attached to the flow surface. However, it may also comprise a pneumatic heater that is realized by a pipe that leads heated air into a chamber in the forward part of the flow body.

The second chordwise section may refer to a trailing edge section, which may comprise the above-identified trailing edge assembly. Here, the second heating device comprises an electric heater in the form of one or a plurality of heater mats. These may be bonded or cured to the at least one skin in the second chordwise section. This may be achieved, for example, by including a heater mat into an arrangement of pre-forms to be resin-infused and cured together in an autoclave cyclone. This allows to minimize an additional weight emanating from the second heating device. It also leads to an integrated, forward, or sideward facing interface connector protruding out of the trailing edge assembly for a connection to an electrical supply line inside the forward section.

Providing two separate heating devices, wherein the at least second heating device comprises an electric heater, provides the advantage that melting water accumulating at the leading edge section will also be heated up in a trailing edge section to avoid the formation of ice in the second chordwise section.

The first chordwise section may include the leading edge of the flow body. The leading edge is considered the foremost edge of the flow body, which faces into the air flow and onto which the airflow impinges.

The second chordwise section may at least span over a range of chordwise positions of the flow surface, wherein the range includes chordwise positions between 80% of the chord to 90% of the chord. Thus, the second heating device reaches chordwise positions close to the trailing edge of the flow body. It may span over a clearly larger range of chordwise positions, wherein the range may comprise 60% to 100% of chordwise positions. However, it made be particularly useful to let it span to positions of up to 95% of chordwise positions as a maximum, as the remaining 5% of chordwise positions may not be subjected to icing. The profile thickness at the remaining 5% of chordwise positions may be chosen to be very small, if the second heating device does not extend into this region. Thus, the second electric heating device may simply end just before the actual trailing edge of the flow body. Depending on the design of the flow body, the forward position of the second chordwise section may vary. If, however, a trailing edge assembly according to the above is used, positions further forward than 60% for the second chordwise section do not appear to of further benefit.

The first heating device may comprise an electric heater. Thus, both the first heating device and the second heating device electrically operated. It may be conceivable that both electric heaters are connected to each to a common power supply in order to be supplied with electric power at the same time. However, it may also be conceivable that both heating devices are individually powered and also individually controlled. This may be achieved depending on e.g. practical tests or numerical investigations in order to estimate or determine the required individual heating power for a variety of different flight stages. It may also be conceivable that a main power supply is provided to the flow body in the first chordwise section, where it may be routed to an electrical transfer device extending to the second chordwise section.

The flow body may comprise a trailing edge assembly having a sandwich core enclosed by the flow surface, wherein the second heating device is integrated into the trailing edge assembly. As stated above, the sandwich core may include a honeycomb core sandwich, which is enclosed by the flow surface. The honeycomb sandwich core may be based on a three-layer composite structure consisting of two load-bearing cover skins and a support core in honeycomb form. The honeycomb core may be made from a resin-impregnated sheet-like material, e.g. a textile material in the form of a fiber web. The cover skins may be made from the same material. The honeycomb core and the skins are usually bonded to each other. It may be conceivable to integrate the second heating device directly into the upper cover skin, such that after curing the trailing edge assembly the second heating device is not removable from the trailing edge assembly nondestructively.

The second heating device may be arranged in a top section of the sandwich core, such that it directly bonds to the bottom side of the flow surface. This may be achieved by bonding or otherwise gluing the trailing edge assembly to the forward part of the flow body, thereby bonding, or gluing the trailing edge assembly to the flow surface.

The flow body may comprise an at least partially solid trailing edge component enclosed by the flow surface, wherein the second heating device is arranged between the flow surface and the at least partially solid trailing edge component. The at least partially solid trailing edge component may exemplarily include an aluminium or titanium component, to which the second heating device is attached. It may be used as an alternate or additional solution to the sandwich core. The term "at least partially solid" is to be understood in that the trailing edge component is not necessarily a component that comprises a volume that is completely filled with the respective material. It is conceivable that the trailing edge also comprises one or a plurality of holes or recesses for reducing the weight. Still further, the trailing edge component may also comprise a fiber-reinforced part that comprises a core made from a lighter material, such as a foam core.

The stiffening structure may comprise a trailing spar, wherein the second chordwise section at least partially extends behind the trailing spar, and wherein the second heating device has at least one connection cable routed through and/or around the trailing spar to extend from behind the trailing spar to a position in front of the trailing spar. For example, the flow body comprises a trailing edge assembly, which is directly connected to the trailing spar. The second heating device is connected to an electric power supply through at least one connection cable that extends to the forward part of the flow body. The trailing spar may comprise an opening or a recess, through which the at least one connection cable runs. However, it may also run around the trailing spar, e.g. at a lateral side or a top or bottom side, such that the trailing spar does not need an opening or a recess for this purpose.

The trailing spar may comprise at least one opening, wherein the at least one connection cable is routed through the at least one opening.

It is conceivable that the stiffening structure may be made from a plurality of ribs, which are connected to at least a leading spar and a trailing spar, wherein the spars extend transverse to the ribs. The stiffening structure may also comprise at least one load introduction rib, wherein the at least one opening is arranged at a distance from the at least one load introduction rib. It is conceivable that the stiffening structure comprises two load introduction ribs at a distance to each other. In a geometric center of the two load introduction ribs, the opening may be placed. However, it may be possible to place the opening as far away as possible in an inboard or an outboard direction of the load introduction ribs.

The trailing spar may comprise a support bracket arranged in front of the trailing spar, wherein the at least one connection cable extends through and/or is held by the support bracket. The support bracket may hold a connection interface, i.e. a plug or a socket, at a predetermined position, which allows to plug in a supply connection from the forward section of the flow body. The support bracket may mechanically compensate the structural integrity in the region of the opening in the trailing spar. Hence, the support bracket may act as a local stiffening or a local thickening of the profile of the trailing spar.

The at least one opening may be at an inboard end and/or an outboard end of the trailing spar. Consequently, the at least one opening is arranged in a lateral region of the trailing spar. Thus, the respective opening may be provided far away from load carrying ribs or load introduction ribs, which may exemplarily be situated in a center region of a bay. Inboard and outboard ends of a flow body are often less loaded than a center region of the flow body.

The flow body may comprise at least one cavity at an outboard end and/or an inboard end, wherein the at least one connection cable extends through the at least one cavity to run around the trailing spar. The cavity may be placed outside the stiffening structure, such that the connection cable does not necessarily need to extend through a part of the stiffening structure. For example, most slats comprise a cavity at an end, such that it is possible to make the wiring go through the trailing edge and a rib at the outboard or inboard end without penetrating the trailing spar at all. This may be an advantageous and/or preferred solution.

The at least one connection cable may run along an outer lateral surface of the flow body. Thus, it may even extend outside of the flow body. It may be exposed to an indirect airflow if it is running in an undercut when the flow body is in an extended position.

The at least one connection cable may run along the outer lateral surface along an overhang of the flow surface. The overhang may be created by the flow surface. The outer lateral surface may be created through an outer surface of a rib that is arranged at the outboard or inboard end of the flow body.

The flow body may be a leading edge slat couplable with a wing leading edge of an aircraft. As stated above, the flow body may be arranged on a wing leading edge through an actuation mechanism.

The invention also relates to a wing of an aircraft, having a leading edge and a trailing edge, and at least one flow body according to the above description coupled with the wing. It is conceivable that a plurality of flow bodies are present, which may each be designed according to the above. However, it may be possible to provide differently designed flow bodies at different positions of the respective wing, depending on their shape, size and other aerodynamic and/or geometric influences.

The invention further relates to an aircraft, having at least one wing described above and/or at least one flow body described further above.

Still further, the invention relates to a method of heating a flow surface of a flow body for an aircraft for preventing or removing ice accumulation, the method comprising heating a first heating device attached to or integrated into the flow surface in a first chordwise section, heating a second heating device attached to or integrated into the flow surface in a second chordwise section, wherein the first chordwise section and the second chordwise section are distanced from each other, wherein the first chordwise section is closer to the leading edge than the second chordwise section, and wherein at least heating the second heating device comprises delivering an electric current to an electric heater comprised in the second heating device. The heating may be conducted at the same time, in an alternating manner and/or consecutively. It is conceivable that a controller is coupled with both heating devices and control operation of both heating devices according to the actual flight state and icing conditions.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

Figure 1:
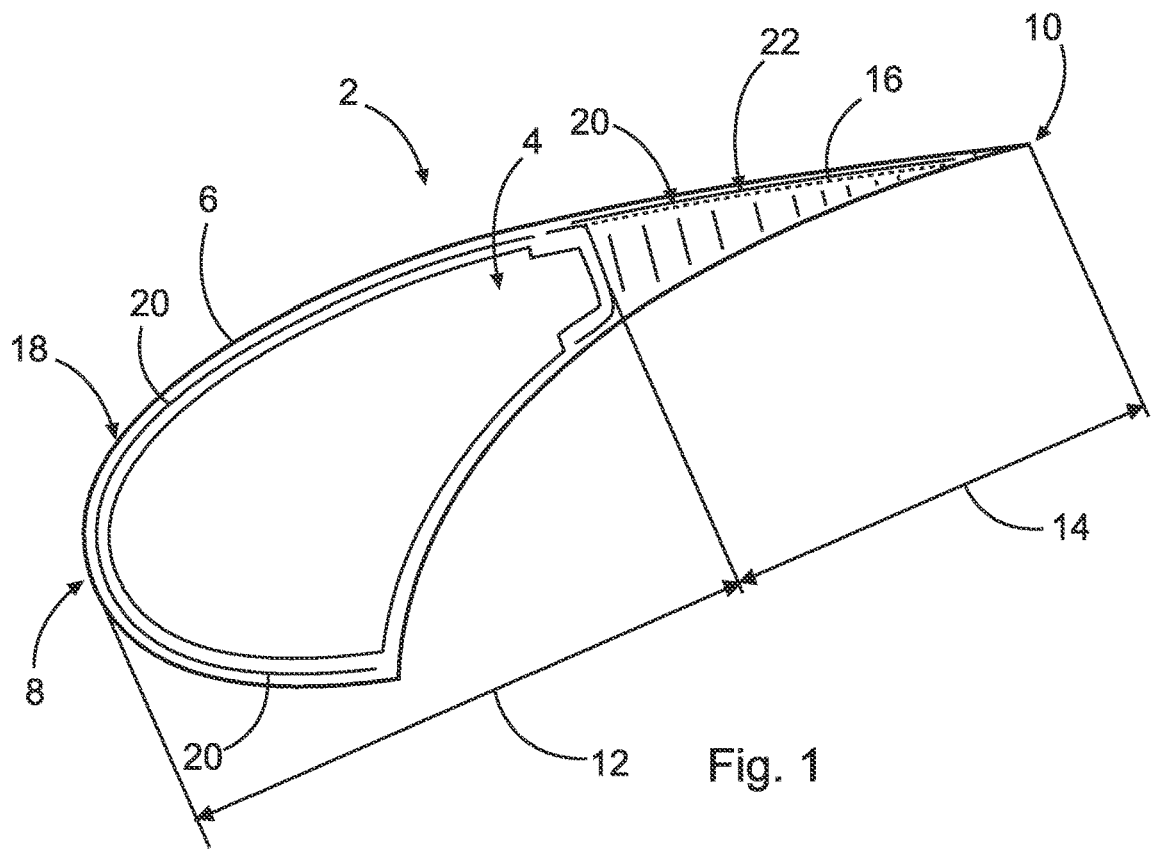
FIG. 1 illustrates a flow body with a sandwich core.

FIG. 1 shows a flow body 2 for an aircraft in a lateral sectional view. It comprises a stiffening structure 4, which is enclosed by a flow surface 6. The stiffening structure 4 may comprise ribs and/or spars, which provide a sufficient mechanical stiffness. In the example shown, the flow body 2 is a leading edge slat, which is couplable with a wing of the respective aircraft and may be movably supported, such that it is extendable particularly in an axial direction. The flow body 2 comprises a leading edge 8 and a trailing edge 10, which are at a distance to each other in a chordwise direction.

Exemplary, the flow body 2 comprises a first chordwise section 12 and a second chordwise section 14. The stiffening structure 4 substantially extends over the first chordwise section 12, while the second chordwise section 14 comprises a sandwich core 16. In the first chordwise section 12, a first heating device 18 is provided and comprises heater mats 20. These are electrically operated and serve for heating the first chordwise section 12 of the flow body 2 for preventing ice accumulation or for melting already accumulated ice. The heater mats 20 are exemplarily arranged at the underside of the flow surface 6.

In the second chordwise section 14, a second heating device 22 is provided, which is also realized in the form of a heater mats 20. However, the heater mat 20 is integrated into the sandwich core 16 by bonding or co-curing. Thus, during the manufacturing of the sandwich core 16, the heater mat 20 is provided as an integrated component, which may preferably be co-cured with directly adjacent components. By enclosing both the forward part and the rear part with the flow surface 6, two distinct regions of a single flow body 2 can be heated. Water that flows from the first chordwise section 12 to the second chordwise section 14 is prevented from icing, if the second heating device 22 is operated.

Figure 2:
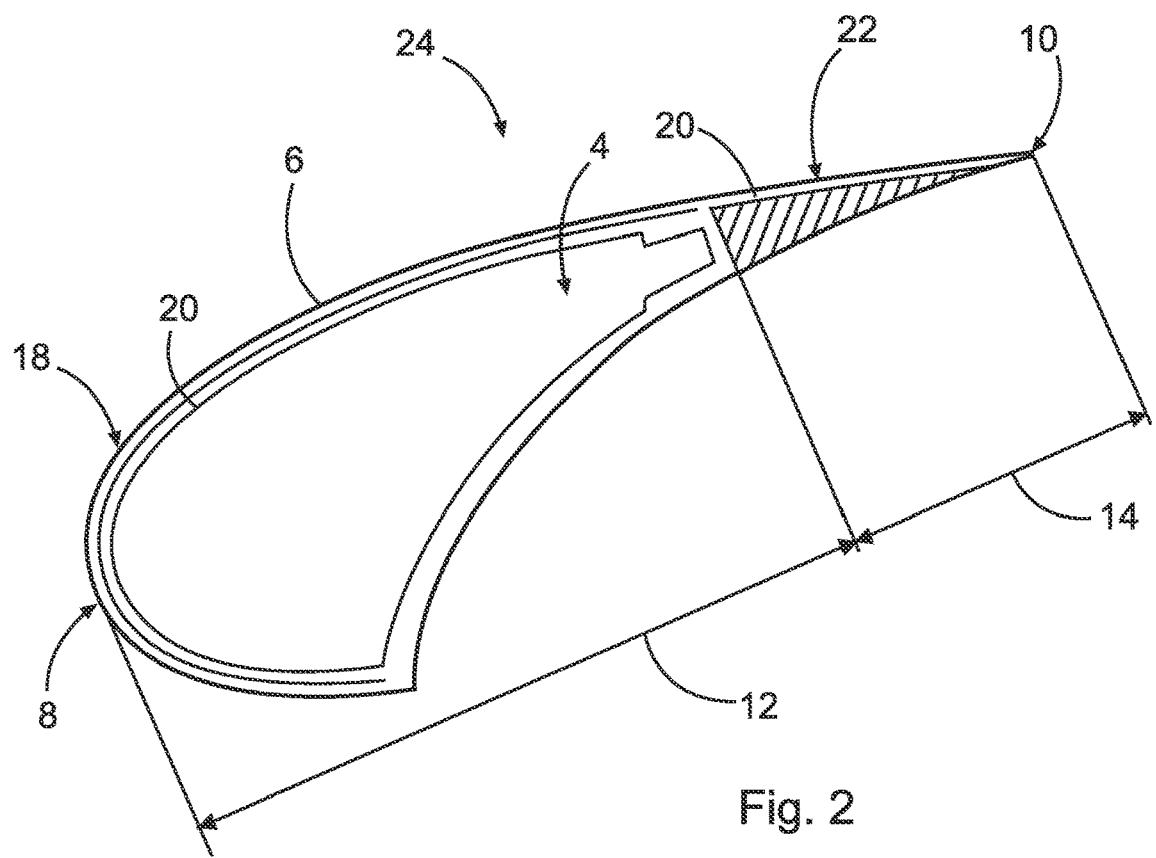
FIG. 2 illustrates a flow body with a solid trailing edge component.

In FIG. 2, a similar flow body 24 is shown. However, instead of using a sandwich core 16, a solid trailing edge component 26 is provided. Here, also a heater mat 24 realizing a second heating device 22 is provided. It may be glued or bonded to an upper side of the solid trailing edge component 26 and is also covered by the flow surface 6.

Figure 3:
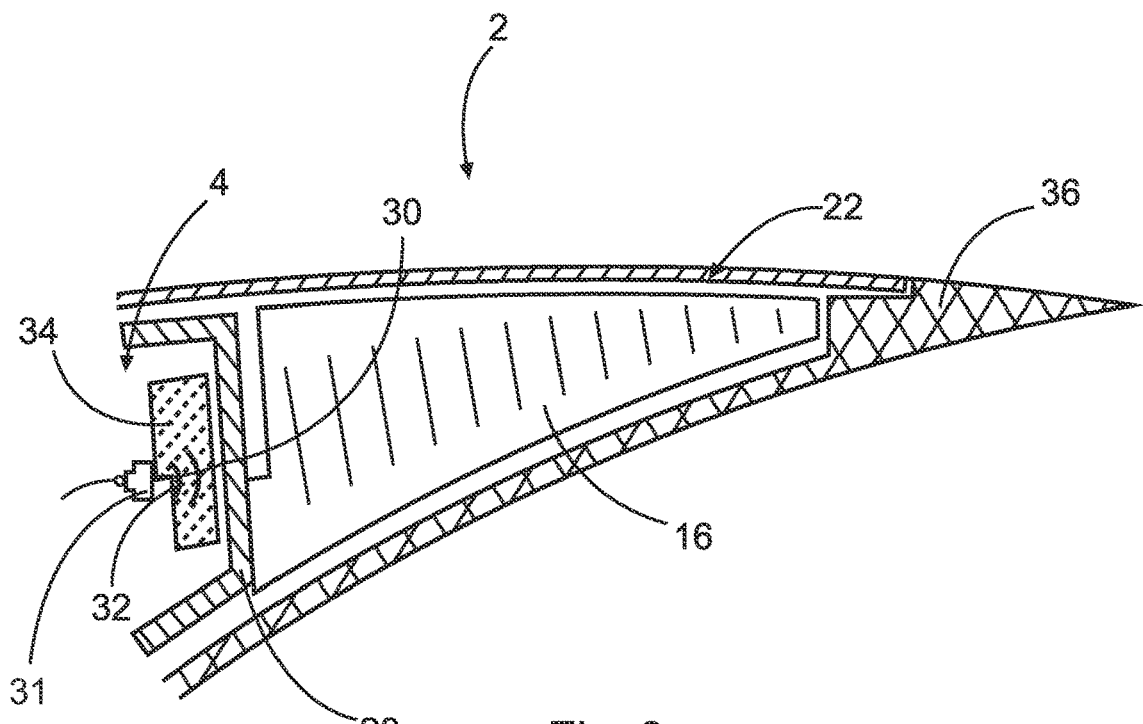
FIGS. 3 to 5 illustrate a part of the flow body of FIG. 1 in various different views.

FIG. 3 shows the flow body 2 in a more detailed view. Here, substantially only the second chordwise section is shown as well as a trailing spar 28 of the stiffening structure 4. The trailing spar 28 comprises an opening 30, through which a connection cable 32 extends. Exemplarily, a support bracket 34 is provided, which is positioned directly in front of the opening 30, i.e., facing the leading edge 8. The support bracket 34 comprises an interface 31 for connection with a power supply cable. In this view, a solid trailing edge element 36 is arranged directly behind the sandwich core 16. The second heating device 22 extends to a position directly in front of the solid trailing edge element 36, which may be placed in the last 5% of the chordwise position, i.e. from 95% to 100% of the chord.

Figure 4:
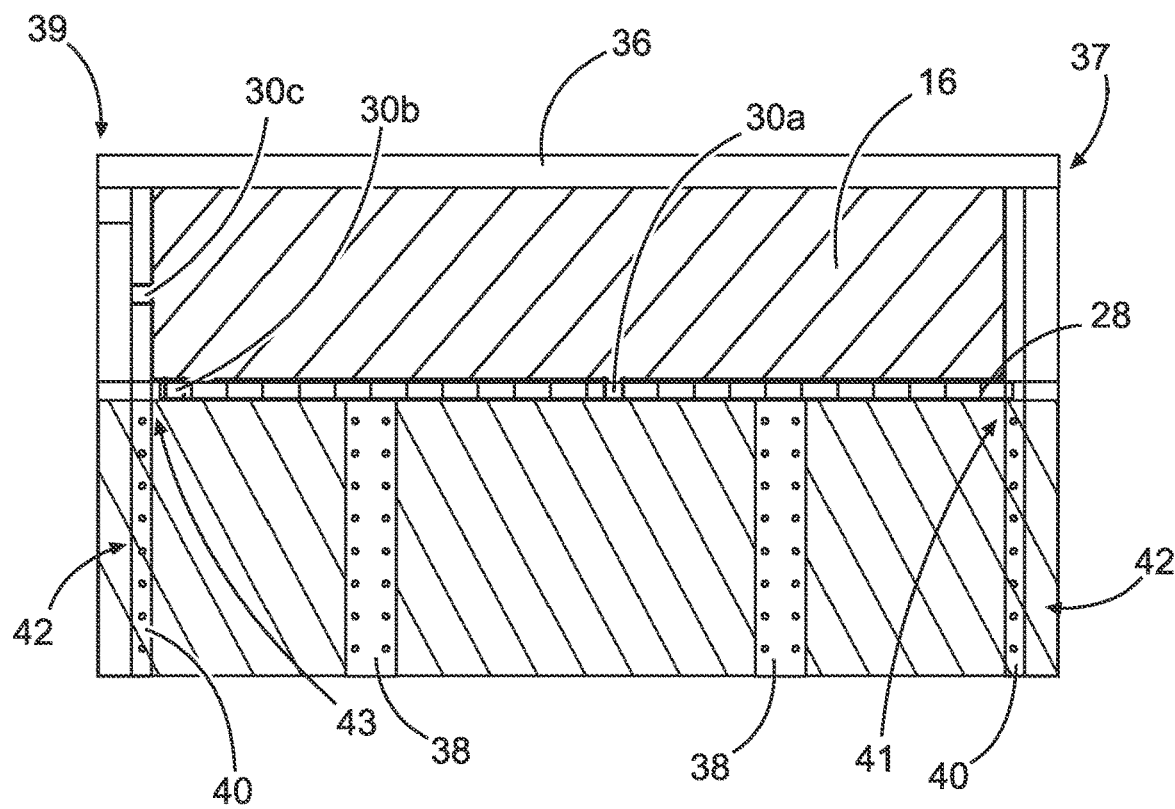

FIG. 4 shows substantially the same part of the flow body 2 shown in FIG. 3, but in a top view. Here, the solid trailing edge element 36 is shown in the upper part of the drawing, while the core sandwich 16 is placed directly below. Further below, the trailing spar 28 is shown, which has an inboard end 37 and an outboard end 39. Two load introduction ribs 38 spaced apart from each other are connected to the trailing spar 28. End ribs 40 at lateral ends, i.e. at an inboard end 37 and at an outboard end 39, are provided, wherein each of the ribs 40 is followed by an end cavity 42 directly in a further lateral direction.

The opening 30 for the connection cable 32 may be placed in several different positions. For example, it may be placed in a central region between the load introduction ribs 38, e.g. directly in the geometric center of an intermediate space between both load introduction ribs 38. The respective opening 30 is referred to with the reference numeral 30*a* in FIG. 4. However, the opening 30 may also be placed further away in a lateral direction and is exemplarily provided near one of the end ribs 40, e.g. at an outboard end 43 of the trailing spar 28, which is arranged at the outboard end 39 of the flow body 2. Here, an opening is referred to with reference numeral 30*b*. As an alternative or in addition thereto, the opening 30 may also be placed at an inboard end 41 of the trailing spar 28 near the inboard end 37 of the flow body 2. Still further, the respective end rib 40 may comprise an opening 30*c*, such that the connection cable can be routed through the end cavity 42.

Figure 5:
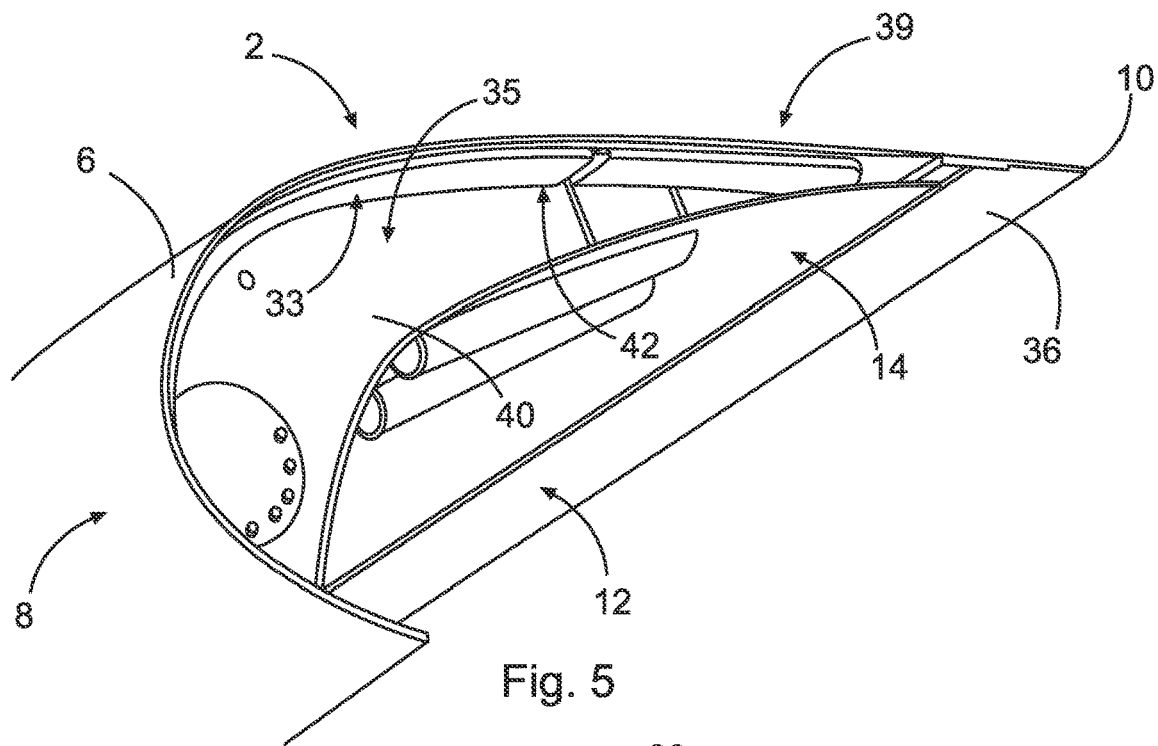

FIG. 5 shows the flow body 2 in the form of a slat in a three-dimensional view. Here, one of the end ribs 40, e.g. at the outboard end 39 of the flow body 2, and a respective end cavity 42 are shown. The end rib 40 comprises an outer rib surface 35, along which the connection cable 32 may run. As an alternative or in addition thereto, the connection cable 32 may also run along an overhang surface 33 at a bottom side of the flow surface 6. As the flow surface 6 protrudes over the end rib 40, it creates an overhang with the end rib 40. The connection cable 32 may also run along an intersection edge between the surface 33 and the outer rib surface 35. The overhang surface 33 and the outer rib surface 35 may be referred to as outer lateral surfaces in the context of the description above.

Figure 6:
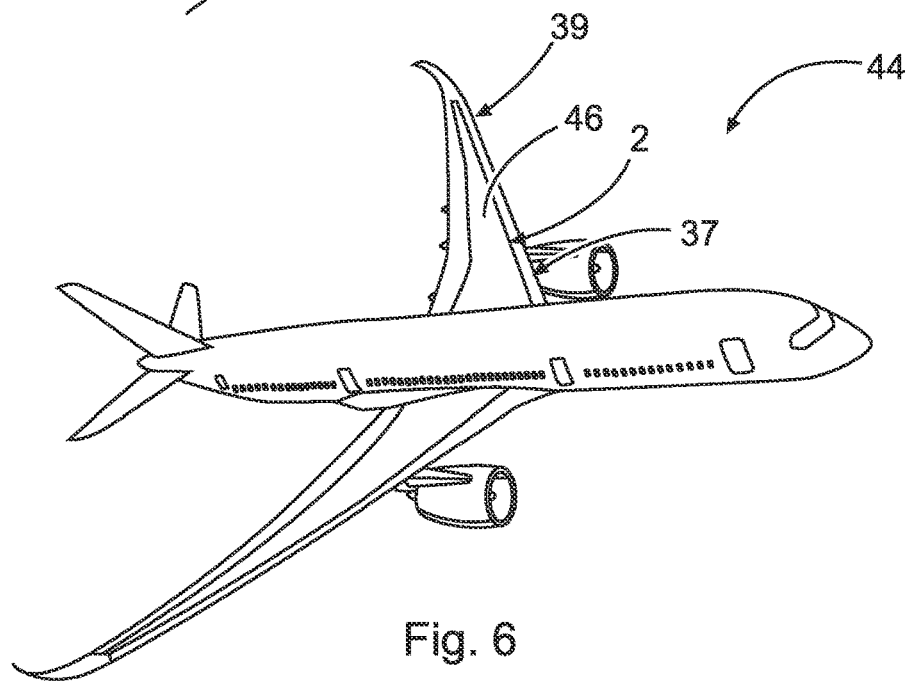
FIG. 6 illustrates an aircraft.

FIG. 6 shows an aircraft 44, which comprises wings 46, to which the flow body 2 is movably arranged.

Figure 7:
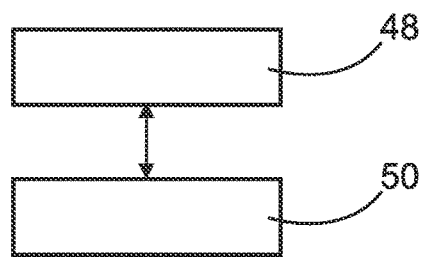
FIG. 7 illustrates a flow chart of a method of heating the flow surface.

FIG. 7 shows a method of heating the flow surface 6 of the flow body 2 or 24 for preventing or removing ice accumulation. The method comprises heating 48 the first heating device 18 attached to or integrated into the flow surface 6 in the first chordwise section 12, heating 50 the second heating device 22 attached to or integrated into the flow surface 6 in the second chordwise section 14, wherein the first chordwise section 12 and the second chordwise section 14 are distanced from each other, wherein the first chordwise section 12 is closer to the leading edge 8 than the second chordwise section 14, and wherein at least heating 48 the second heating device 22 comprises delivering an electric current to an electric heater comprised in the second heating device 22. Both heating 48 and 50 may be conducted at the same time, in an alternating manner and/or consecutively.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flow body for an aircraft, comprising a stiffening structure and a flow surface at least partially enclosing the stiffening structure, the flow surface having a leading edge and a trailing edge at a distance to each other in a chordwise direction, and a solid trailing edge element, the flow body further comprising:
   a first heating device attached to or integrated into the flow surface in a first chordwise section,
   a second heating device attached to or integrated into the flow surface in a second chordwise section,
   wherein the first chordwise section and the second chordwise section are distanced from each other,
   wherein the first chordwise section is closer to the leading edge than the second chordwise section,
   wherein at least the second heating device comprises an electric heater, and
   wherein the second heating device extends to a position directly in front of the solid trailing edge element.

2. The flow body of claim 1, wherein the second chordwise section at least spans over a range of chordwise positions of the flow surface, and
   wherein the range includes chordwise positions between 80% of the chord and 90% of the chord.

3. The flow body of claim 1, wherein the first heating device comprises an electric heater.

4. The flow body of claim 1, further comprising a trailing edge assembly having a sandwich core enclosed by the flow surface, and
   wherein the second heating device is integrated into the trailing edge assembly.

5. The flow body of claim 1, further comprising an at least partially solid trailing edge component enclosed by the flow surface, and
   wherein the second heating device is arranged between the flow surface and the at least partially solid trailing edge component.

6. The flow body of claim 1, wherein the stiffening structure comprises a trailing spar,
   wherein the second chordwise section at least partially extends behind the trailing spar, and
   wherein the second heating device has at least one connection cable routed through and/or around the trailing spar to extend from behind the trailing spar to a position in front of the trailing spar.

7. The flow body of claim 6, wherein the trailing spar comprises at least one opening, and
   wherein the at least one connection cable is routed through the at least one opening.

8. The flow body of claim 6, wherein the trailing spar comprises a support bracket arranged in front of the trailing spar, and
   wherein the at least one connection cable extends through and/or is held by the support bracket.

9. The flow body of claim 7, wherein the at least one opening is at an inboard end and/or an outboard end of the trailing spar.

10. The flow body of claim 6, wherein the flow body comprises at least one cavity at an outboard end and/or an inboard end, and wherein the at least one connection cable extends through the at least one cavity.

11. The flow body of claim 1, wherein the flow body is a leading edge slat couplable with a wing leading edge of an aircraft.

12. A wing for an aircraft, having a leading edge and a trailing edge, and at least one flow body according to claim 1 coupled with the wing.

13. An aircraft, comprising at least one flow body according to claim 1.

14. A method of heating a flow surface of a flow body for an aircraft for preventing or removing ice accumulation, wherein the flow body comprises a solid trailing edge element, the method comprising:
- heating a first heating device attached to or integrated into the flow surface in a first chordwise section,
- heating a second heating device attached to or integrated into the flow surface in a second chordwise section,
- wherein the first chordwise section and the second chordwise section are distanced from each other,
- wherein the first chordwise section is closer to the leading edge than the second chordwise section,
- wherein at least heating the second heating device comprises delivering an electric current to an electric heater comprised in the second heating device, and
- wherein the second heating device extends to a position directly in front of the solid trailing edge element.

* * * * *